O. J. JOHNSON.
MACHINE FOR REMOVING SUPERFLUOUS SOLDER FROM SHEET METAL CANS.
APPLICATION FILED OCT. 3, 1913.
1,206,443.
Patented Nov. 28, 1916.
4 SHEETS—SHEET 2.
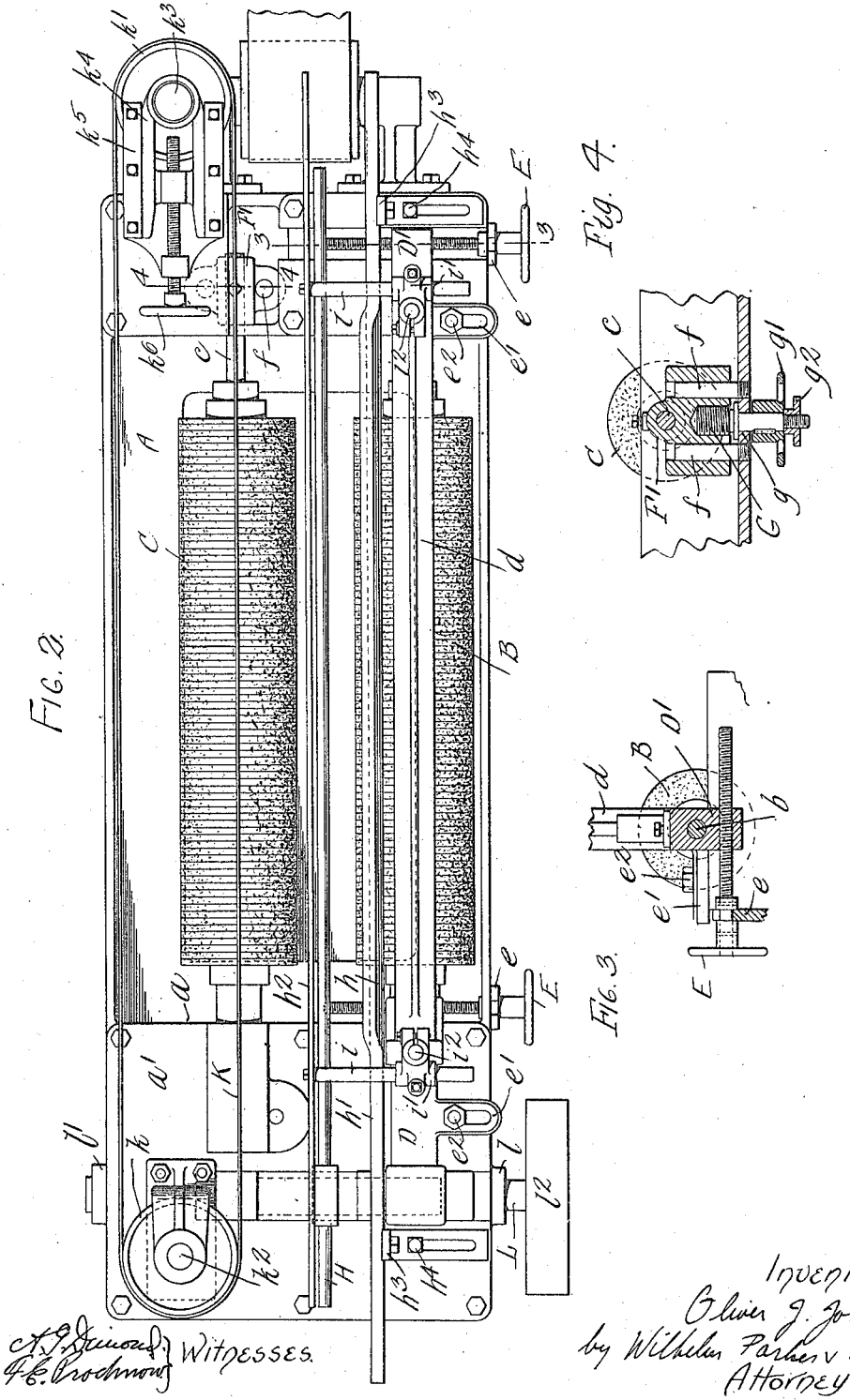

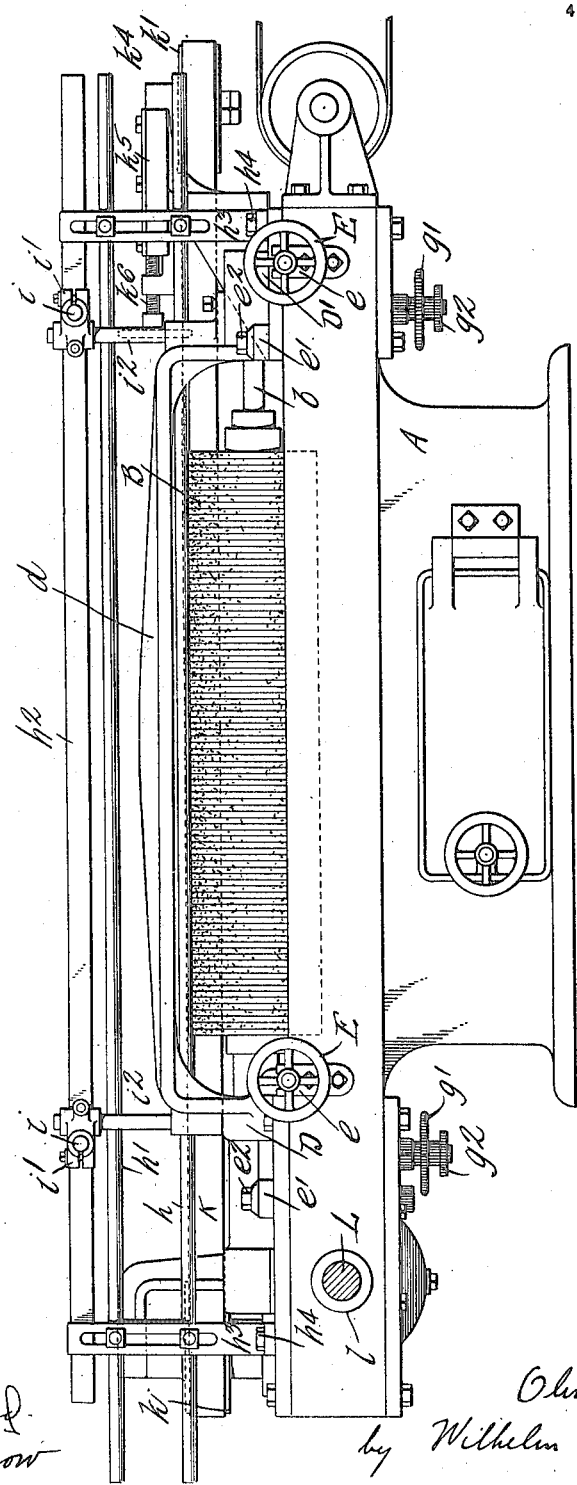

O. J. JOHNSON.
MACHINE FOR REMOVING SUPERFLUOUS SOLDER FROM SHEET METAL CANS.
APPLICATION FILED OCT. 3, 1913.

1,206,443.

Patented Nov. 28, 1916.
4 SHEETS—SHEET 3.

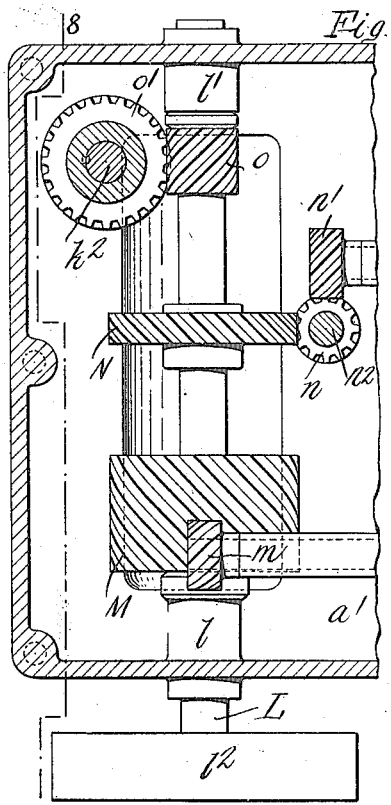
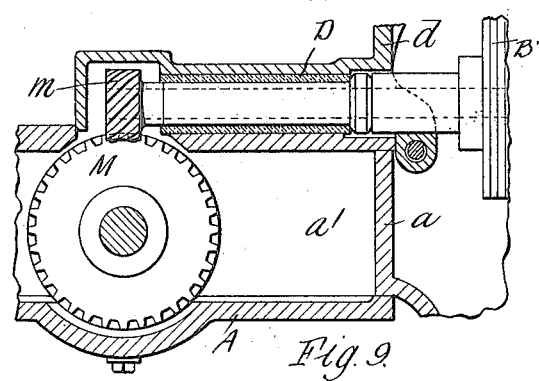
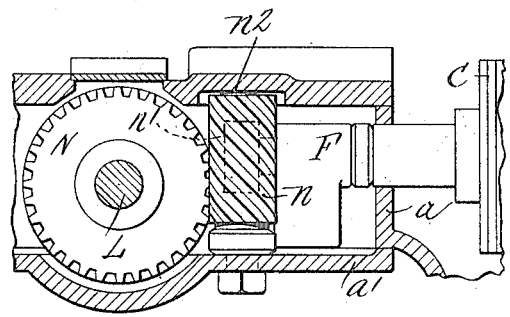
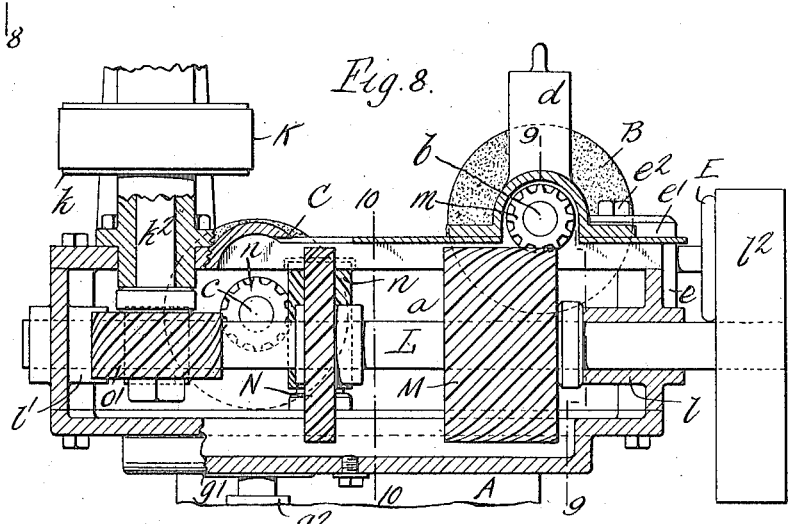

UNITED STATES PATENT OFFICE.

OLIVER J. JOHNSON, OF WHEELING, WEST VIRGINIA.

MACHINE FOR REMOVING SUPERFLUOUS SOLDER FROM SHEET-METAL CANS.

1,206,443.

Specification of Letters Patent.

Patented Nov. 28, 1916.

Application filed October 3, 1913. Serial No. 793,160.

*To all whom it may concern:*

Be it known that I, OLIVER J. JOHNSON, a citizen of the United States, residing at Wheeling, in the county of Ohio and State of West Virginia, have invented a new and useful Improvement in Machines for Removing Superfluous Solder from Sheet-Metal Cans, of which the following is a specification.

This invention relates to that type of machines for removing superfluous solder from sheet metal cans in which the cans are conveyed, while the solder thereon is soft, past one or more driven brushes or buffing rolls or members which wipe the superfluous solder from the surface of the seamed ends of the cans. In some of the machines heretofore used for this purpose only one brush or roll is provided, and the superfluous solder is not thoroughly removed from both the side and end surfaces of the cans. Other machines have brushes which operate on both the sides and ends of the cans, but they are objectionable for the reason that they require separate drive belts for each brush, or complicated and troublesome drive mechanism in order to enable the brushes to be adjusted to compensate for the wear therein and to adapt the machines for operation on cans of different sizes.

The objects of this invention are to produce an efficient and desirable machine which will thoroughly remove superfluous solder from both the sides and ends of cans and in which simple and durable mechanism for positively driving the brushes or buffing rolls is provided which enables the brushes or rolls to be quickly and easily adjusted as may be required without necessitating any separate adjustment or manipulation of the drive mechanism; and also to improve the construction of solder saving machines in the other respects hereinafter described and set forth in the claims.

Figure 5:
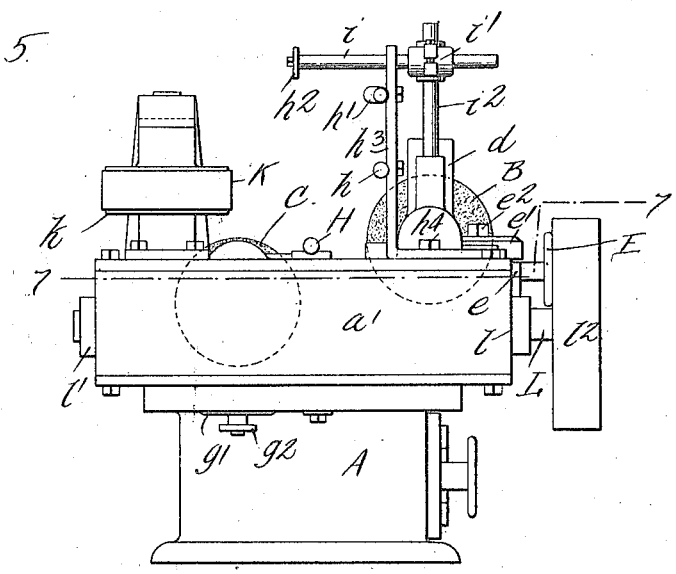
Figure 6:
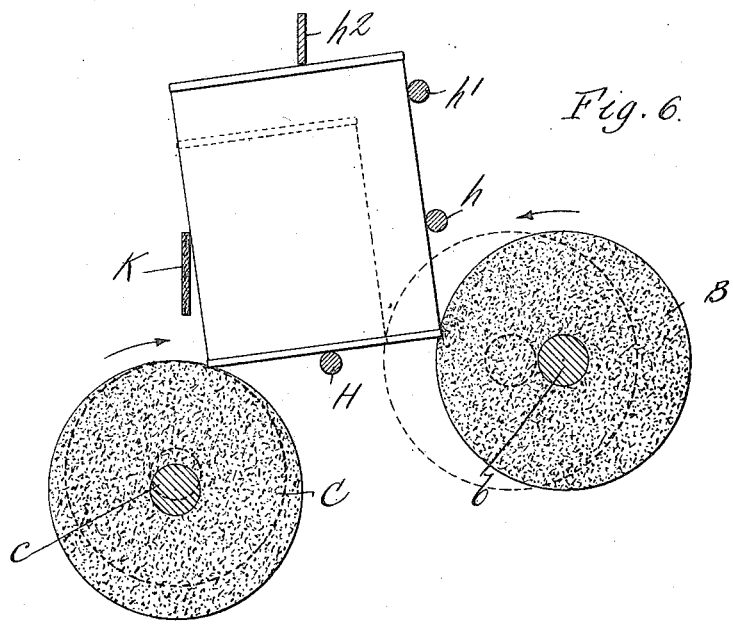

In the accompanying drawings, consisting of four sheets: Figure 1 is a front elevation of a machine embodying the invention for removing superfluous solder from sheet metal cans. Fig. 2 is a plan view thereof. Fig. 3 is a sectional elevation in line 3—3, Fig. 2, showing one of the adjusting devices for the side brush. Fig. 4 is a sectional elevation in line 4—4, Fig. 2, showing one of the adjusting devices for the bottom brush. Fig. 5 is an end elevation of the machine. Fig. 6 is a fragmentary sectional elevation on an enlarged scale, showing the relation of the cans to the side and bottom brushes or buffing rolls and can guide. Fig. 7 is a fragmentary horizontal sectional plan, on an enlarged scale, in line 7—7, Fig. 5. Fig. 8 is a transverse sectional elevation in line 8—8, Fig. 7. Fig. 9 is a fragmentary longitudinal sectional elevation in line 9—9, Fig. 8. Fig. 10 is a similar view in line 10—10, Fig. 8.

The frame or base A of the machine may be of any suitable construction, but is preferably in the form of a hollow housing which provides a receptacle for the solder which is removed from the cans. Near one end, this housing is preferably provided with a transverse partition or wall $a$, Figs. 9 and 10, which, with the top, bottom and end walls of the housing, forms a closed gear casing $a'$ for the brush or roll drive mechanism hereinafter described.

B and C represent two rotary brushes, buffing rolls or solder removing members which are preferably arranged parallel with each other in suitable positions for the brushes to operate respectively on the side and bottom faces of the lower ends of the cans which are conveyed through the machine lengthwise of the brushes or buffing rolls in a suitable guide-way, as indicated in Fig. 6. The brushes may be of any construction suitable for the purpose. For example, each brush is composed of circular disks of fabric secured face to face on a central shaft. For brevity of description, the brushes or rolls B and C will be hereinafter referred to respectively as the side brush and bottom brush. The side brush B is adjustable laterally toward and from the bottom brush to compensate for wear in the brush and to enable it to operate properly on cans of different diameters; and the bottom brush C is adjustable vertically to compensate for the wear therein and to cause the brush to contact properly with the bottom face of the cans in the can guide.

The brushes may be adjustably mounted in any suitable way. As shown, the shaft $b$ of the side brush is journaled at its ends in bearings D and D' which are connected by a yoke $d$ and are adapted to slide horizontally transversely of the machine on the top of the base or frame A. The bearings are adjusted by screws E, Figs. 1 and 2, which are journaled and held from endwise movement in bearings $e$ on the frame A and work in screwthreaded holes in the bearings D D'. By turning these adjusting screws the bearings and the side brush carried thereby can be adjusted laterally inwardly or outwardly on the frame. The bearings D D' have slotted feet or portions $e'$ through which pass clamping bolts $e^2$, by which the bearings can be rigidly secured in adjusted positions.

The shaft $c$ of the bottom brush is journaled at its ends in bearings F' which are adapted to be adjusted vertically on guide rods $f$ in the base of the machine, and these bearings are adjusted vertically by screws G which turn in bearing holes $g$ in the frame A and work in screwthreaded holes in the bearings. The screws are adapted to be turned for adjusting the bearings by hand wheels $g'$ splined on their lower ends and are secured, when adjusted, by clamping nuts $g^2$ screwed on the threaded lower ends of the adjusting screws.

The track or guide on which the cans are moved past the brushes may be of any usual or suitable construction. As shown, it is composed of a bottom rod or rail H which extends longitudinally of the machine between the side and bottom brushes, side rails $h$ $h'$ and a top rail $h^2$. The side rails are secured to supporting legs $h^3$ which are provided with slotted feet adjustably secured by bolts $h^4$ on the top of the base or frame A. The side rails can thus be adjusted horizontally toward or away from the plane of the bottom rail, as may be required for cans of different diameters. The top rail $h^2$ is secured to horizontal rods $i$ which are adjustable endwise in clamps $i'$ which in turn are adjustable vertically on upright posts $i^2$ which rise from the base or frame A. The top rail is thus adapted to be adjusted both horizontally and vertically to suit cans of different sizes.

The cans are conveyed on end along the can track or guide with the bottoms of the cans resting at one side against the bottom brush, as shown in Fig. 6, and are caused to revolve in contact with the bottom and side brushes by the usual belt K. This belt passes around pulleys $k$ $k'$ adjacent to the opposite ends of the machine. The pulley $k$ is secured to an upright driven shaft $k^2$, and the shaft $k^3$ of the other pulley $k'$ is journaled in a bearing $k^4$ which is slidably adjustable in a suitable guide $k^5$ for tensioning the belt. The pulley $k'$ is adjusted by means of a hand screw $k^6$, Fig. 2.

The parts of the machine above mentioned, while preferably being arranged and constructed as shown in the drawings and as above described, may be of any usual or suitable construction and arrangement.

The drive mechanism for the side and bottom brushes, buffing rolls or solder removing members is preferably constructed as follows: L represents a main drive shaft which extends transversely of the machine at one end thereof through the gear casing $a'$ and is journaled in suitable bearings $l$ $l'$ in the base or frame A. This shaft, see Figs. 7–10, is provided at one end with a pulley $l^2$ for a drive belt, and is provided inside of the gear casing $a'$ with a spiral toothed gear wheel M which meshes with and drives a spiral toothed pinion $m$ secured to the adjacent end of the shaft $b$ of the side brush. The gear wheel M is of considerable length axially, thus adapting the pinion $m$ to be adjusted to different positions lengthwise of the gear wheel M and to properly mesh therewith and be driven thereby in various different adjustments. Thus the side brush B can be adjusted horizontally toward or from the bottom brush C, the pinion $m$ being adapted to roll on the gear wheel M when the side brush is so adjusted, and it is not necessary to make any adjustments in the drive gearing or for the gear wheels to be out of mesh with each other when the brush is adjusted. The drive shaft L is also provided inside of the gear casing $a'$ with a spiral toothed gear wheel N, Figs. 7, 8 and 10, which meshes with and drives a spiral toothed pinion $n$ which turns on a vertical axis and meshes with and drives a spiral toothed pinion $n'$ secured to the adjacent end of the shaft $c$ of the bottom brush. The pinion $n$ may be journaled, as shown, on an upright shaft $n^2$ seated at its ends in the top and bottom plates of the frame or base A, or in any other suitable manner. This pinion is of considerable length axially or vertically, thus adapting the pinion $n'$ on the brush shaft to be adjusted vertically along the pinion $n$ and remain in proper mesh therewith. The vertical adjustment of the bottom brush, therefore, does not affect the operative engagement of the pinion $n'$ with the pinion $n$. The drive gearing does not in anywise interfere with the ready vertical adjustment of the bottom brush, and no separate adjustment of this drive mechanism is necessitated when the brush is adjusted up or down.

It will be observed that both the side and bottom brushes are driven from the one drive shaft L and each brush is positively connected with the drive shaft by toothed gearing so that the brushes are driven positively and at a uniform speed and there is no chance for slippage in the drive mechanism. While both of the brushes are connected to the drive shaft by toothed gearing and are positively driven thereby, nevertheless the drive gearing does not in anywise interfere with the ready horizontal and vertical adjustments of the brushes and no adjustments of the gearing are necessary to enable the required adjustments of the brushes. The entire drive gearing for the two brushes is housed within the gear casing $a'$, which may be filled with grease so as to insure always the thorough lubrication of the drive mechanism.

The spiral toothed gearing is also desirable for the reason that the brushes revolve at a high rate of speed, and the spiral gearing is less noisy and produces a steadier and smoother motion of the brushes than straight toothed gearing.

The gearing described overcomes the objectionable slipping and breaking of separate drive belts for the brushes, and is much simpler and less troublesome than belts or chains connecting the brushes because the variation in the distance between the centers of the brushes, caused by adjusting the brushes, requires adjustments of the belts or chains or the use of tensioning devices.

While in the machine illustrated the cans are intended to stand upright while being operated upon, it will be apparent that the brushes can be arranged to permit of the cans lying on their sides and being operated by the same drive mechanism.

As shown, the drive shaft $k^2$ for the conveyer belt is also connected to and driven from the main drive shaft L by intermeshing spiral toothed gear wheels $o$ and $o'$. The conveyer belt could, however, be driven by any other suitable mechanism.

I claim as my invention:

1. In a machine for removing superfluous solder from cans, the combination of rotary solder-removing members which are arranged to revolve about substantially parallel axes and are adjustable in direct alinements at an angle to each other, a drive shaft, and toothed gear wheels which connect the drive shaft to both of said solder-removing members and are arranged to permit said adjustments of the solder-removing members without disturbing the mesh of said gear wheels.

2. In a machine for removing superfluous solder from cans, the combination of rotary solder-removing members which are adjustable in directions at an angle to each other, a drive shaft, intermeshing gear wheels which connect the drive shaft directly to one of said solder-removing members and permit the adjustment of said member rectilinearly in one direction, and intermeshing gear wheels which connect the drive shaft directly to the other solder-removing member and permit the adjustment of said member rectilinearly in a direction at an angle to the direction of adjustment of the first solder-removing member.

3. In a machine for removing superfluous solder from cans, the combination of rotary solder-removing members which are adjustable in directions at an angle to each other, a drive shaft, and spiral gear wheels which connect the drive shaft to both of said solder-removing members and are arranged to permit the adjustment of said solder-removing members rectilinearly in directions at an angle to each other without disturbing the mesh of said gear wheels.

4. In a machine for removing superfluous solder from cans, the combination of rotary solder-removing members which are adjustable in directions at an angle to each other, a drive shaft, spiral gear wheels which connect the drive shaft to one of the solder-removing members and permit the adjustment of said member lengthwise of the drive shaft, and spiral gear wheels which connect the drive shaft to the other solder-removing member and permit the adjustment of said member crosswise of the drive shaft.

5. In a machine for removing superfluous solder from cans, the combination of solder-removing members arranged to revolve about substantially parallel axes, a drive shaft which extends in a direction crosswise of said axes, means for adjusting said solder-removing members in different directions one substantially parallel with and the other crosswise of said drive shaft, and gearing connecting each of said members to said drive shaft and including a spiral gear driven by said drive shaft, a spiral gear secured to one of said members and meshing with said driven gear when said member is adjusted to different positions, an idler spiral gear actuated by said drive shaft, and a gear connected with said other solder-removing member and connected with said idler.

6. In a machine for removing superfluous solder from cans, the combination of substantially parallel rotary solder-removing members, one of which is adjustable vertically and the other of which is adjustable horizontally, a drive shaft, spiral toothed gearing connecting each of said members to said drive shaft and comprising a gear wheel which is driven by said drive shaft, a gear wheel which meshes with said driven gear wheel and which is connected to one of said members and is movable therewith to different positions relative to said first mentioned gear wheel, a second driven gear wheel, an idler driven by said second driven gear wheel, and a gear wheel which meshes with said idler and which is connected to the other of said members and is movable therewith to different positions relative to said idler.

Witness my hand, this 20th day of September, 1913.

OLIVER J. JOHNSON.

Witnesses:
J. P. WELLS,
C. W. RENT.